United States Patent
Zhang et al.

(10) Patent No.: US 8,412,696 B2
(45) Date of Patent: Apr. 2, 2013

(54) REAL TIME SEARCHING AND REPORTING

(75) Inventors: Steve Y. Zhang, San Francisco, CA (US); Stephen P. Sorkin, San Francisco, CA (US); Vishal Patel, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 105 days.

(21) Appl. No.: 13/018,236

(22) Filed: Jan. 31, 2011

(65) Prior Publication Data

US 2012/0197928 A1    Aug. 2, 2012

(51) Int. Cl.
*G06F 17/30* (2006.01)
(52) U.S. Cl. ........................................ 707/706
(58) Field of Classification Search .................. 707/2, 3, 707/706; 709/225; 700/108
See application file for complete search history.

(56) References Cited

U.S. PATENT DOCUMENTS

| | | | |
|---|---|---|---|
| 6,826,439 B1 * | 11/2004 | Barber et al. | ................. 700/108 |
| 7,464,077 B1 | 12/2008 | Baunach et al. | |
| 2005/0108200 A1 | 5/2005 | Meik et al. | |
| 2007/0055555 A1 | 3/2007 | Baggett et al. | |
| 2010/0042590 A1 | 2/2010 | Smyros et al. | |
| 2012/0197934 A1 | 8/2012 | Zhang et al. | |

OTHER PUBLICATIONS

International Search Report and Written Opinion for International Patent Application No. PCT/US2012/023400 mailed Jul. 30, 2012.
Official Communication for U.S. Appl. No. 13/362,437, mailed Feb. 5, 2013.

* cited by examiner

*Primary Examiner* — Etienne Leroux
(74) *Attorney, Agent, or Firm* — Frommer Lawrence & Haug LLP; John W. Branch (57) ABSTRACT

A system arranged to search machine data to generate reports in real time. A search query is provided that includes a plurality of search commands. The search query is parsed to form a main search query and a remote search query. Machine data is collected from remote data sources and evaluated against one of the main and remote search queries to generate a set of search results. The main search query is then evaluated against at least a partial set of the search result to generate at least one report regarding the collected machine data. Each report can be provided for display to a user.

31 Claims, 8 Drawing Sheets

Search Parsing Module
305

FIG. 9

Search Execution Module
310

FIG. 10

Reporting Module
315

REAL TIME SEARCHING AND REPORTING

TECHNICAL FIELD

This invention relates generally to searching and reporting of data, and, more specifically, to generating real time reports of machine data.

BACKGROUND

Information systems generate vast amounts and wide varieties of machine data (e.g., activity logs, configuration files, messages, database records). This data can be useful in troubleshooting systems, detecting operation trends, catching security problems, and measuring business performance. However, the challenge lies in organizing, searching, and reporting the data in a manner that allows a person to understand and use the data.

A conventional method for searching machine data involves storing the data into a database and then executing a search on the database. For example, existing large scale search engines like those by Google and Yahoo are designed to crawl the Internet in order to build a repository of hyperlinks. Once this information has been stored, it can be searched by a remote user. This process of building a repository can take hours or even days to complete depending on the size of the data set.

While the conventional database-oriented searches are appropriate for some situations, they are ill-suited for handling real-time searches. Real-time searches find information as soon as it is produced. With real-time searches, it is preferable to reduce the delay between the collection of data and the searching of the data. In conventional search systems, this delay is unavoidable and may be caused by a number of factors. For example, it is generally not efficient to continuously write data to a database as it is being collected. Thus, some conventional search systems wait until a sufficient amount of data is collected before accessing the database to store the data so that it is searchable. Such a delay may not seem significant, but for extremely time sensitive applications, even a 30 second delay can be important. For example, an IT administrator may want to understand patterns of machine data behavior from network devices in order to identify potential security threats. Time is of the essence when responding to security threats. Even a short delay in the processing of the machine data may result in vital information being compromised before the administrator can halt the attack.

Further, conventional search systems are inefficient at handling real-time searches. Suppose a user wants to generate a continuous report of machine data as it is being collected. With the conventional approach, a system would have to periodically (e.g., every few seconds) search the database for new machine data. However, modern databases can be multiple terabytes in size. Also, periodically searching such a huge database may consume a non-trivial amount of processing power and consume resources that could be put to better use elsewhere.

BRIEF DESCRIPTION OF THE FIGURES

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description, which is to be read in association with the accompanying drawings, wherein.

DETAILED DESCRIPTION OF THE EMBODIMENTS

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the invention is directed to methods, systems and computer-readable medium for enabling searching and reporting of machine data in real time and/or non-real time. In one embodiment, a search query is received from a user and divided into two parts: a remote query and a main query. The system determines the nature of the search query, such as whether the query is a real-time search query or a historical (e.g. non real-time) search query. If the search query is a historical search query, a search is evaluated on machine data stored in a database. If the search is a real-time search query, machine data is collected from various data sources and evaluated against the remote query to generate a set of search results. Subsequently, the system evaluates the main query against the search results to generate a search report of the collected machine data.

In at least one embodiment, the invention enables the ability to search machine data in real-time as it is being collected. In other words, incoming data can be queried as soon as it occurs. By bypassing the database, the delay and overhead associated with searching a database is avoided. Also enabled is the ability to generate a preliminary report, or preview, of the search results at any time while the results are being collected.

Further, the machine data can be searched in real time and simultaneously stored into the database for use with historical or non-real time searches. In one embodiment, after the machine data is collected, it is committed to a database. The database can later be used for historical searches. Thus, both real-time and historical searches of collected machine data can be performed.

Figure 1A:
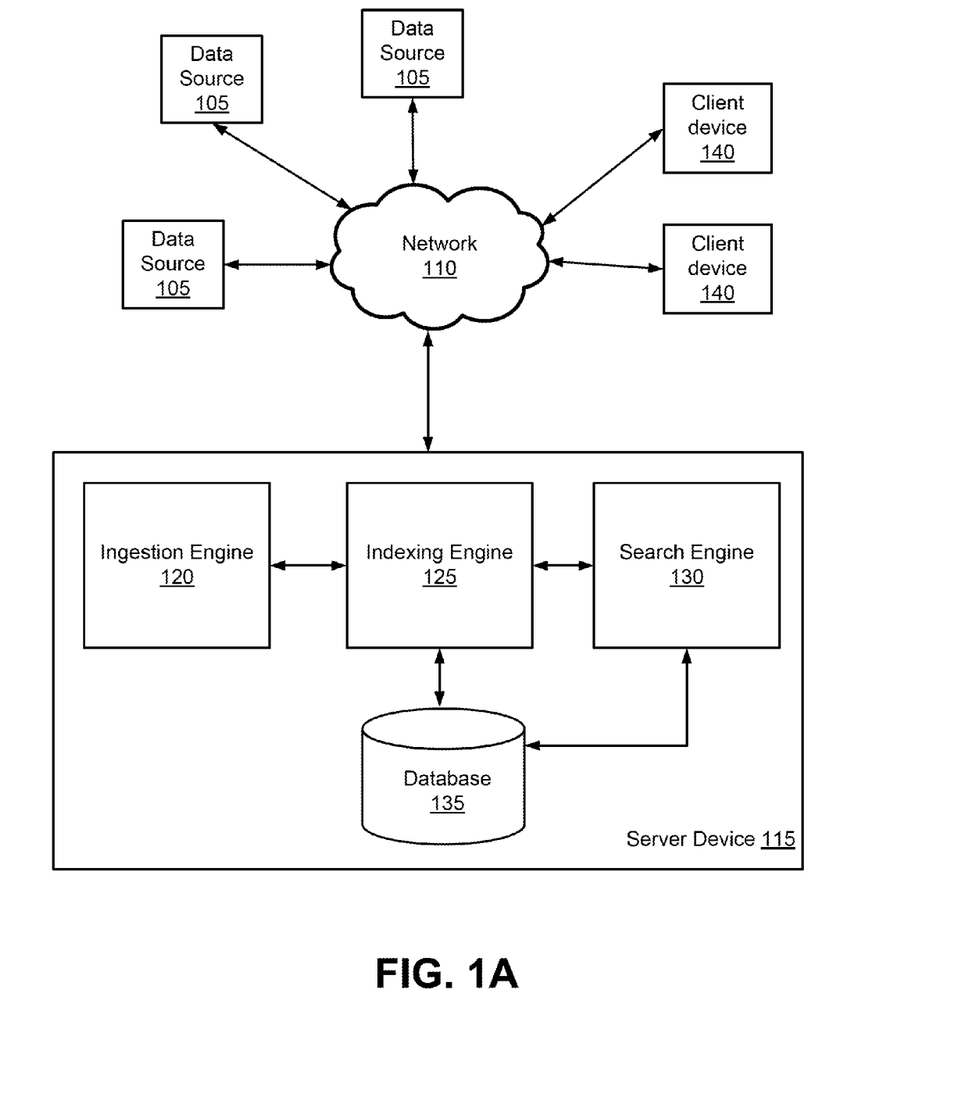
FIG. 1A illustrates one embodiment of a block diagram illustrating a system for performing a real-time search.

FIG. 1A shows a block diagram illustrating a system for performing a real-time search according to at least one embodiment of the invention. The system includes server device 115 that communicates with a plurality of data sources 105 and a plurality of client devices 140 over network 330, e.g., the Internet. In at least one embodiment, network 330, may include a local area network (LAN), a wide area network (WAN), a wireless network, and the like. Moreover, in at least one other embodiment, functions described with respect to a client application or a server application in a distributed network environment may take place within a single client device without server device 115 or network 330.

In addition to the components described here, server device 115 may also include conventional components such as a processor, an operating system, and volatile and non-volatile memory. Server device 115, depicted as a single computer system, may also be implemented as a network of computer systems and/or processors. Examples of server device 115 are servers, mainframe computers, networked computers, any processor-based computing device, and similar types of systems and devices. In one embodiment, server device 115 includes a random access memory (RAM) coupled to a processor. The processor executes computer-executable program instructions stored in memory. Such processors may include a microprocessor, an ASIC, state machines, or other processors, and can be any of a number or arrangement of suitable computing processors. Such processors include, or may be in communication with, code modules and/or applications, which store instructions that, when executed by a processor, cause the processor to perform the actions described herein. Some embodiments of the system have different and/or other modules than the ones described herein. Similarly, the steps described herein can be distributed among the modules in accordance with other embodiments in a different manner than is described here.

As shown in at least one embodiment, server device 115 can include an ingestion engine 120, indexing engine 125, and search engine 130. Ingestion engine 120 collects machine data (MD) from data sources 105 through user-supplied scripts. Data sources 105 can include computers, routers, databases, operating systems, and applications. Each data source 105 may be producing one or more different types of machine data, e.g. server logs, activity logs, configuration files, messages, database records, and the like. Machine data can arrive synchronously or asynchronously from a plurality of sources. There may be many MD sources and large quantities of MD across different technology and application domains. For example, a computer may be logging operating system events, a router may be auditing network traffic events, a database may be cataloging database reads and writes or schema changes, and an application may be sending the results of one application call to another across a message queue.

As shown in one embodiment, indexing engine 125 may receive MD from ingestion engine 120 and process the MD into events to allow for fast keyword searching. The events can be searched in real-time by search engine 130 without the search engine having to access database 135. The events are also indexed and stored in database 135 for use with non-real time searches. Database 135 is shown as located at server device 115. However, in other embodiments, database 135 may not be physically located at server device 115. For example, database 135 may be located at client device 140, in an external storage device coupled to server device 115, or accessed through network 110.

As shown in one embodiment, search engine 130 may provide search and reporting capabilities. Search engine 130 receives a search query from client device 140. If the search query is a real-time search, the query is used to retrieve events from indexing engine 125. Some real-time searches can be forward-looking searches for future events that have not yet occurred. For example, a user may want to monitor the activity of an organization's Information Technology (IT) infrastructure by having a continuously updated display of the top IP addresses that produce ERROR messages. Alternatively, if the search is a non-real-time search, the query may be used to obtain past events that are already stored in database 135. Non-real-time searches, or historical searches, are backwards-looking searches for events that have already occurred. For example, a user might want to locate the top IP addresses that produced ERROR messages within the last three hours. Additionally, if the search is a hybrid search query, events can be retrieved from both indexing engine 125 and database 135. Hybrid search queries are both forwards and backwards looking. An example is a search query for the top IP addresses that produced ERROR message in a time window that started 4 hours ago and continues indefinitely into the future. At anytime during either search process, search engine 130 can collect the search results to generate a preview report of the search results. The report is output to client device 140 for presentation to a user.

Client devices 140 can include a processor coupled to a computer-readable memory. Client devices 140 also may include a number of external or internal devices such as a mouse, a CD-ROM, DVD, a keyboard, a display device, or other input or output devices. Examples of client devices 140 are personal computers, digital assistants, personal digital assistants, cellular phones, mobile phones, smart phones, pagers, digital tablets, laptop computers, Internet appliances, and other processor-based devices. In one embodiment, client devices 140 may be any type of processor-based platform that operates on any suitable operating system that are capable of executing one or more user application programs. For example, client device 140 can include a personal computer executing a web browser that sends search queries to server device 115 and receives a real-time search report from server device 115.

Those of skill will appreciate that other embodiments of the invention include systems having architecture varying from precisely that which is shown in FIG. 1.

Figure 1B:
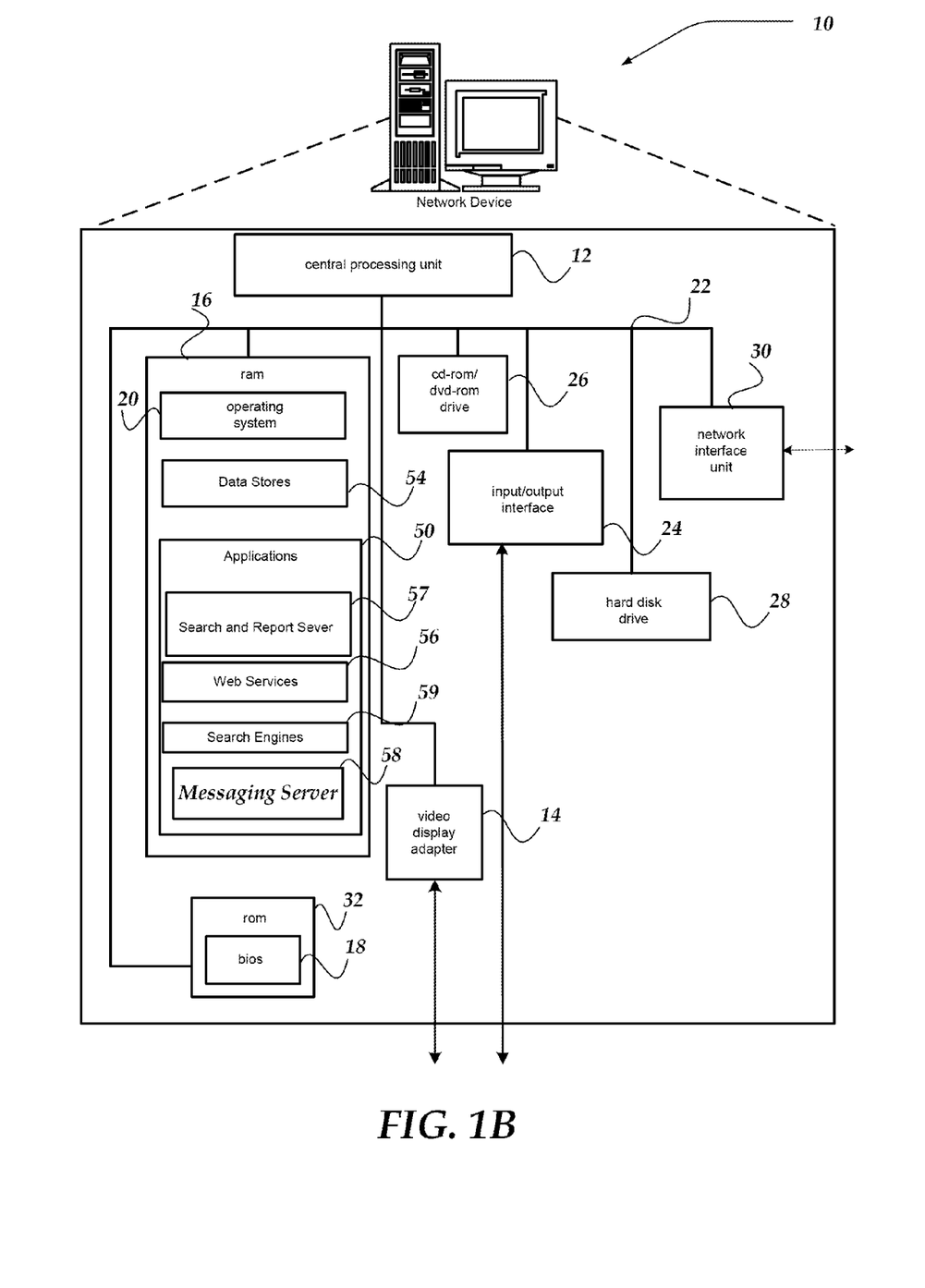
FIG. 1B shows one embodiment of a network device that may be included in the system.

FIG. 1B shows one embodiment of a network device 10, according to one embodiment of the invention. Network device 10 may include many more or less components than those shown. The components shown, however, are sufficient to disclose an illustrative embodiment for practicing the invention. Network device 10 may represent, for example, Client device 140, data source device 105, and server device 115 of FIG. 1.

Network device 10 includes processing unit 12, video display adapter 314, and a mass memory, all in communication with each other via bus 22. The mass memory generally includes random access memory (RAM) 16, read only memory (ROM) 32, and one or more mass storage devices, such as hard disk drive 28, tape drive, optical drive, and/or floppy disk drive. The mass memory stores operating system 20 for controlling the operation of network device 10. Any general-purpose operating system may be employed. Basic input/output system ("BIOS") 18 is also provided for controlling the low-level operation of network device 10. As illustrated in FIG. 1A, network device 10 may also communicate over the Internet, or some other wired or wireless communications network, via network interface unit 30, which is constructed for use with various communication protocols including the TCP/IP protocol. Network interface unit 30 is sometimes known as a transceiver, transceiving device, or network interface card (NIC).

In one or more embodiments, the mass memory as described above enables computer-readable storage for information, such as computer readable instructions, data structures, program modules, machine data, or other data. Examples of mass memory embodied by non-transitory computer readable storage medium include RAM, ROM, EEPROM, flash memory or other types of memory technologies, CD-ROM, digital versatile disks (DVD) or other optical storage, magnetic cassettes, magnetic tape, magnetic disk storage or other magnetic storage devices, or any other physical storage medium which can be used to store the desired information and which can be accessed (executed and/or read) by a computing device.

As shown, data stores 54 may include a database, text, spreadsheet, folder, file, or the like, that may be configured to maintain and store user account identifiers, user profiles, email addresses, IM addresses, and/or other network addresses; or the like. Data stores 54 may also store various authoritative scores, citation models, and the like. Data stores 54 may further include program code, data, algorithms, and the like, for use by a processor, such as central processing unit (CPU) 12 to execute and perform actions. In one embodiment, at least some of data and/or instructions stored in data stores 54 might also be stored on another device of network device 10, including, but not limited to cd-rom/dvd-rom 26, hard disk drive 28, or other computer-readable storage device resident on network device 10 or accessible by network device 10 over, for example, network interface unit 30.

The mass memory also stores program code and data. One or more applications 50 are loaded into mass memory and run on operating system 20. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 56, messaging server 58, search engines 59, and search and report (SR) server 57, may also be included as application programs within applications 50. SR server 57 is configured to include ingestion engine 120, indexing engine 125, search engine 130, and database 135. In any event, SR server 57 may employ processes such as are described below in conjunction with FIGS. 1A, and 2-11 to perform at least some of its actions.

Messaging server 58 may include virtually any computing component or components configured and arranged to forward messages from message user agents, and/or other message servers, or to deliver messages to a local message store, such as data store 54, or the like. Thus, messaging server 58 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 58 may also be managed by one or more components of messaging server 58. Thus, messaging server 58 may also be configured to manage SMS messages, IM, MMS, IRC, RSS feeds, mIRC, or any of a variety of other message types. In one embodiment, messaging server 58 may enable users to initiate and/or otherwise conduct chat sessions, VOIP sessions, or the like.

Web services 56 represent any of a variety of services that are configured to provide content, including messages, over a network to another computing device. Thus, web services 56 include for example, a web server, a File Transfer Protocol (FTP) server, a database server, a content server, or the like. Web services 56 may provide the content including messages over the network using any of a variety of formats, including, but not limited to WAP, HDML, WML, SMGL, HTML, XML, cHTML, xHTML, or the like.

In one embodiment, Web services 56 may receive content, including multimedia content from another network device, such as a client device, or the like. Web services 56 may then enable a user to prepare and/or otherwise manage the content for access by various other users. As such, web services 56 may allow users to manage blog pages, social content sharing sites, or the like. Further, web services 56 may enable various users of client devices to access, read, and even comment on various content. For example, web services 56 may allow a user to identify various content as their favorite content. Similarly, web services 56 may allow a user to copy content from one sight, then using any of a variety of content editing applications, modify the content, and/or post the modified content on another website. Thus, in one embodiment, a user might access, for example, an image from one website, crop or otherwise modify the image, and post the modified image on another site.

Web services 56 may also enable a user to access one or more search engines 59 to perform various search queries for content, including image content, textual content, and/or any of a variety of other multimedia content.

Figure 2:
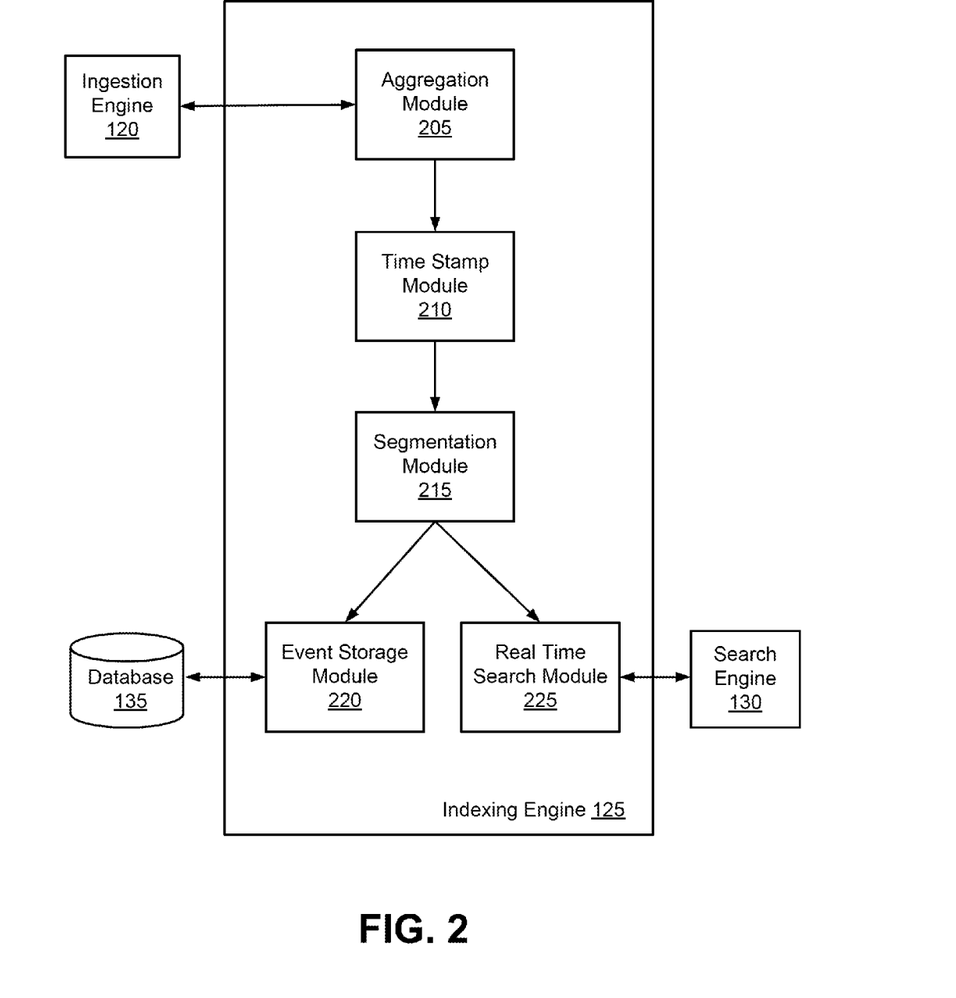
FIG. 2 illustrates one embodiment of a high level block diagram illustrating modules within an indexing engine.

FIG. 2 illustrates a block diagram of at least one embodiment of indexing engine 125. Indexing engine 125 receives MD from ingestion engine 120 and breaks the data into events. Indexing engine 125 can associate a time stamp with each event and also segment the events. The events are indexed and stored into database 135. Additionally, the events can be searched in real-time in response to a query from search engine 130. As illustrated in FIG. 2, indexing engine may include aggregation module 204, time stamp module 210, segmentation module 215, event storage module 220, and real time search module 225. The detailed operations of these modules will be explained in the following sections by reference to FIGS. 4-7.

Figure 4:
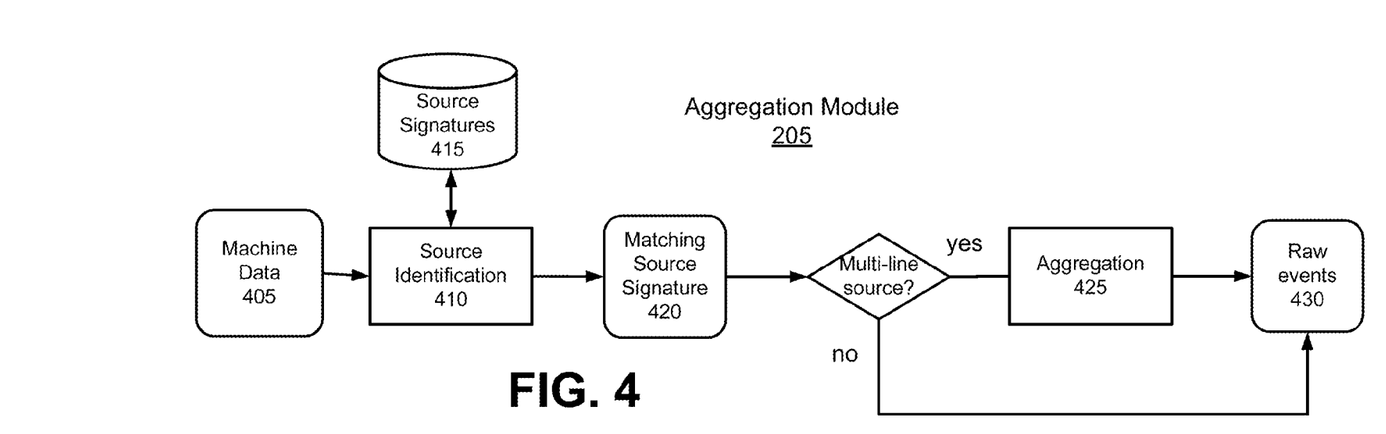
FIG. 4 illustrates one embodiment of the operation of an aggregation module.

FIG. 4 is a flow chart illustrating at least one embodiment of the operations of aggregation module 205. Aggregation module 205 is responsible for breaking the raw MD 405 into individual events 430. MD 405 collected from web servers may have a single line per event, in which case each line of MD 405 is a new event. MD 405 may also contain events that have a large number of lines, making identification of individual events within the stream difficult. In one embodiment, the aggregation module uses feature extraction (e.g., leading punctuation, significant words, white space, and breaking characters) and machine learning algorithms to determine where the event boundaries are. Identifying events in this manner is now described in greater detail.

Given the repetitive, yet dynamic, nature of machine data 405, an effective aggregation process such as shown in FIG. 4 in various embodiments learns about data formats and structure automatically. In one embodiment, learning is separated into different domains based on the source of MD 405. Domains can be general system types, such as log files, message bus traffic, and network management data, or specific types, such as output of a given application or technology—Sendmail logging data, Oracle database audit data, and J2EE messaging.

In this embodiment, the domain for a given source of MD is identified 410 so that domain-specific organization methods can be applied. Domains are determined through a learning process. The learning process uses collections of MD from well-known domains as input and creates source signature 415 for each domain. In one implementation, source signatures 415 are generated from representative samples of MD 405 by creating a hash table mapping punctuation characters to their frequency. While tokens and token values can change in MD collection, in this particular implementation, signature 415 generated by the frequency of punctuation is quite stable, and reliable within a specific domain. Other implementations could use functions of the punctuation and tokens, such as the frequencies of the first punctuation character on a line, or the first capitalized term on a line. Given that source signatures 415 can be large and hard to read, signatures can have a corresponding label in the form of a number or text that can be machine generated or human assigned. For example, source signature 415 for an Apache web server log might be programmatically assigned label "205", or a user can assign the label "Apache Server Log".

In one embodiment, clustering is used to classify collected MD 405 into domains according to their source signatures 415. As collections of MD 405 are encountered, each collection's signature is correlated to the set of known source signatures 405, such as signatures created through the previously described learning process 415, by performing a nearest-neighbor search. If the distance of the closest corresponding signature 415 is below a threshold, the closest corresponding signature 420's domain is assumed to be the domain of the source. The threshold can be, for example, a numerical value that is configured by an administrator of the server. If no best correspondence can be found, a new source signature 415 is created from the sample signature and a new source domain created. Alternatively, MD 405 can be classified into a default source domain.

In one implementation, the distance between two signatures is calculated by iterating over the union of attributes of the two signatures, with the total signature distance being the average of distances for each attribute. For each attribute A, the value of A on Signature1 and Signature2, V1 and V2, are compared and a distance is calculated. The distance for attribute A is the square of (V1−V2)*IDF, where IDF is the $\log(N/|A|)$, where N is the number of signatures, and $|A|$ is the number of signatures with attribute A.

When a corresponding source signature 420 for a collection of MD has been identified 410, the corresponding aggregation rules are applied to the MD collection. Aggregation rules describe the manner in which MD 405 from a particular domain is organized into event data 430 by identifying the boundaries of events within a collection of MD, for example, how to locate a discrete event by finding its beginning and ending. In one implementation, the method of aggregation 425 learns, without prior knowledge, by grouping together multiple lines from a sample of MD 405. Often MD 405 contains events 430 that are anywhere from one to hundreds of lines long that are somehow logically grouped together.

A collection of MD 405 may be known a priori, or may be classified as single-line type (i.e., containing only single-line events) or multi-line type (i.e., containing both single and multi-line events) prior to performing aggregation. For those MD collections that are classified as single-line type, aggregation 425 is accomplished by breaking each line into a separate event. Multi-line type MD collections are processed 425 for aggregation. In one implementation, a MD collection is classified as a multi-line type if 1) there is a large percentage of lines that start with spaces or are blank (e.g., if more than 5% of the lines start with spaces or are blank), or 2) there are too many varieties of punctuation characters in the first N punctuation characters. For example, if the set of the first three punctuation characters found on each line has more than five patterns (e.g., ':::', '!:!', ',,,', ':..', '( )*'), the collection can be classified as multi-line. This heuristic is based on the assumption that events generally start the same way (e.g., with the words timestamp, ip, username). Thus, if there are varying punctuation formats at the start of each line, it is likely that the collection of MD 405 contains multi-line events.

Another aspect of aggregation methods 425 is the ability to learn, and codify into rules, what constitutes a break between lines and therefore the boundary between events, by analyzing a sample of MD. For example, in one implementation, an aggregation method 425 compares every two-line pair looking for statistically similar structures (e.g., use of white space, indentation, and time-stamps) to quickly learn which two belong together and which two are independent. In one implementation, aggregation 425 works as follows. For each line, the line is checked to determine whether it starts with a time-stamp. Lines starting with a time-stamp are the start of a new event. For lines that do not start with a time-stamp, the line is combined with the prior line to see how often the pair of lines occurs, one before the other, as a percentage of total pairs in the MD sample.

In one embodiment, line signatures are used in place of lines, where a line signature is a more stable version of a line, immune to simple numeric and textual changes. In this implementation, signatures can be created by converting a line into a string that is the concatenation of leading white space, any punctuation on the line, and the first word on the line. For example, the line "10:29:03 Host 191.168.0.1 rebooting:normally" is converted to "::..:Host."

The current line signature can be concatenated with the previous line signature (i.e., signature1 combined with signature2) and used as a combined key into a table of break rules. The break rule table maps the combined key to a break rule, which determines whether there should be a 'break', or not, between the two lines (i.e., whether they are part of different events or not). Break rules can have confidence levels, and a more confident rule can override a less confident rule. Break rules can be created automatically by analyzing the co-occurrence data of the two lines and what percent of the time their signatures occur adjacently. If the two line signatures highly co-occur, a new rule would indicate no break between them. Alternatively, if they rarely co-occur, a new rule would indicate a break between them. For example, if line signature A is followed by line signature B greater than 20% of the time A is seen, then a break rule might be created to indicate a break between them. Rules can also be created based on the raw number of line signatures that follow/proceed another line signature. For example, if a line signature is followed by ten different line signatures, a rule is created that indicates a break between them. If there is no break rule in the break rule table, the default behavior is to break and assume the two lines are from different events. Processing continues by processing each two-line pair, updating line signature and co-occurrence statistics, and applying and learning corresponding break rules. At regular intervals, the break rule table is written out to the hard disk or permanent storage.

Figure 5:
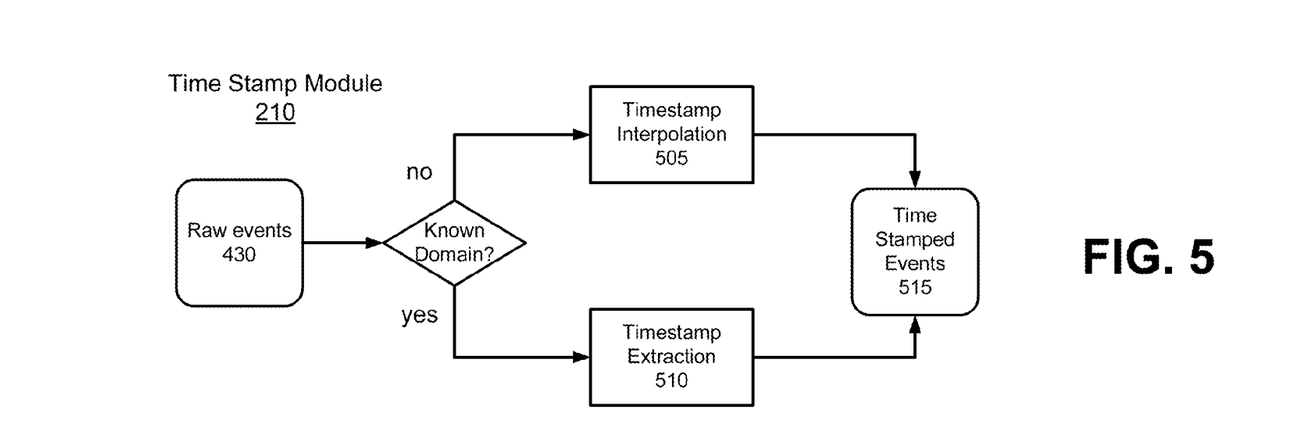
FIG. 5 shows one embodiment of the operation of a time stamp module.

Turning now to FIG. 5, illustrates at least one embodiment of the operation of time stamp module 210. Once incoming machine data 405 has been aggregated 425 into individual events 430, the raw events and their event data are input into a time stamp module 210. Time stamp module 210 determines whether or not the event data contains tokens that indicate a correspondence to one of a collection of known time stamp formats. If so, the event is considered to have a time stamp from a known domain and timestamp extraction 510 is performed. Otherwise, timestamp interpolation 505 is performed.

If a known domain has been identified for an event, event 430 is taken as input to a time stamp extraction step 510 where the time stamp passed from the raw event data is extracted and passed with the event to segmentation module 215. In an exemplary embodiment, this timestamp extraction 310 occurs by iterating over potential time stamp format patterns from a dynamically ordered list in order to extract a time to be recorded as the number of seconds that have passed since the Unix epoch (0 seconds, 0 minutes, 0 hour, Jan. 1, 1970 coordinated universal time) not including leap seconds. Additionally, at least one embodiment takes into account time zone information and normalizes the times to a common offset. To increase performance, the ordering of this list is determined using a move-to-front algorithm, wherein whenever a correspondence is found, the corresponding pattern is moved to the beginning of the list. In such an embodiment, the most frequently occurring patterns are checked earliest and most often, improving performance. The move-to-front lists may be maintained either for all time series data sources together, on a per-source basis (to take advantage of formats in a single source are likely to be similar), or in some other arrangement.

In the case where the event did not contain a time stamp from a known domain, then a timestamp is assigned to the event based on its context. In one embodiment, the time stamp is linearly interpolated 505 from the time stamps of the immediately preceding and immediately following events 430 from the same stream of MD 405. If these events also contain no time stamps from a known domain, further earlier and/or later events can be used for the interpolation. Time stamp extraction module 210 automatically stores the time stamp of every hundredth event (or some other configurable period) from each stream of MD 405 in order to facilitate time stamp interpolation 505. In another embodiment, time stamps are interpolated 505 based on the time associated with the entire stream of MD 405 including acquisition time, creation time or other contextual meta time data.

Referring back to FIG. 2, once the events are time-stamped, segmentation module 215 identifies segments within time-stamped events 515. A segment (also known as a token) is a substring of the incoming event text and a segmentation is the collection of segments implied by the segmentation algorithm on the incoming event data. A segment substring may overlap another substring, but if it does, it is contained within that substring. This property is permitted to apply recursively to the containing substring, so that the segment hierarchy forms a tree on the incoming text.

In at least one embodiment, segmentation is performed by choosing two mutually exclusive sets of characters called minor breakers and major breakers. Whenever a breaking character, minor or major, is encountered during segmentation of the raw data, segments are emitted corresponding to any sequence of bytes that has at least one major breaker on one end of the sequence. For example, if, during segmentation, a minor breaking character is found, then a segment corresponding to the sequence of characters leading from the currently encountered minor breaker back to the last major breaker encountered is recorded. If a major breaker was encountered, then the sequence of characters leading back to either the last major breaker or the last minor breaker, whichever occurred most recently, determines the next segment to be recorded.

Segmentation rules describe how to divide event data into segments (also known as tokens). In one implementation a segmentation rule examines possible separators or punctuation within the event, for example, commas, spaces or semicolons. One aspect of this segmentation is the ability to identify more than individual segments, but also to identify overlapping segments.

For example, the text of an email address, "bob.smith@corp.com", can be broken into individual and overlapping segments; <bob.smith>, <@> and <corp.com> can be identified as individual segments, and <<bob.smith><@><corp.com>> can also be identified as an overlapping segment. As described above, in one implementation, segmentation uses a two-tier system of major and minor breaks. Major breaks are separators or punctuation that bound the outer most segment. Examples include spaces, tabs, and new lines. Minor breaks are separators or punctuation that break larger segments into sub segments, for example periods, commas, and equal signs. In one implementation, more complex separators and punctuation combinations are used to handle complex segmentation tasks, for example handling Java exceptions in an application server log file.

An example of segmentation in our information-processing example, IP addresses could be broken down using white space as major breakers and periods as minor breakers. Thus, the segments for the raw text "192.168.1.1" could be:

"192"
"192.168"
"192.168.1"
"192.168.1.1"

In another implementation, certain segments may represent known entities that can be labeled and further understood algorithmically or by human added semantics. For example, in the above representation, "192.168.1.1" may be understood to be an IP address. Named entity extraction can be algorithmically performed in a number of ways. In one implementation, the segment values or segment form from the same segment across multiple events is compared to an entity dictionary of known values or known forms.

In another implementation, entity extraction techniques are used to identify semantic entities within the data. In one implementation, search trees or regular expressions can be applied to extract and validate, for example, IP addresses or email addresses. The goal of extraction is to assist the segmentation process and provide semantic value to the data.

Figure 6:
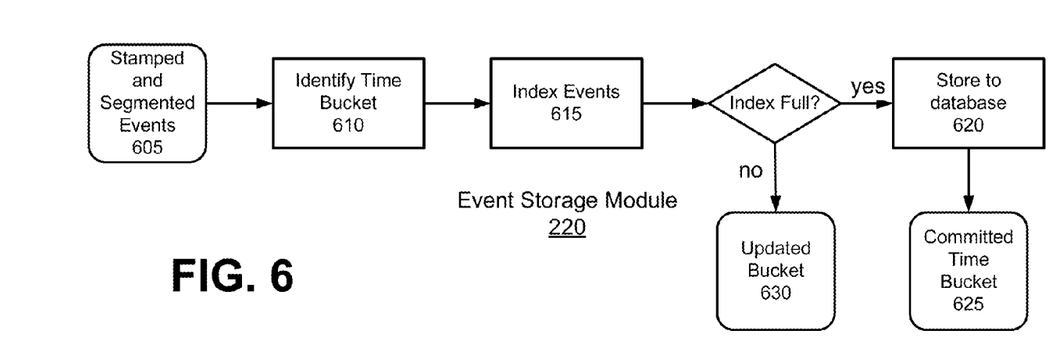
FIG. 6 illustrates one embodiment of the operation of an event storage module.

FIG. 6 illustrates at least one embodiment of the operation of event storage module 220. At this point in the process, incoming events 605 have time stamps and segments associated with them. Event storage module 220 now identifies 610 a bucket for the events, indexes 615 events to their time stamps and segments in a bucket, and stores 620 the bucket into database 135 where it can later be searched by search engine 130.

Events stored into database 135 are often queried and updated using time-based operators. By hashing the components of the index over a set of buckets organized by time, the efficiency and performance of these operators can be improved. The final efficiency of the bucketing will, of course, depend on the hardware configuration, the order in which the events arrive, and how they are queried, so there is not a single perfect bucketing policy.

In at least one embodiment, buckets with a uniform extent are used. For example, each time bucket can handle one hour's worth of data. Alternate policies might vary the bucket extents from one time period to another. For example, a bucketing policy may specify that the buckets for events from earlier than today are three-hour buckets, but that the buckets for events occurring during the last 24 hours are hashed by the hour. In the information processing example, a bucket might cover the period 01-15-2005 12:00:00 to 01-15-2005 14:59:59. In order to improve efficiency further, buckets are instantiated using a lazy allocation policy (i.e., as late as possible) in primary memory (i.e., RAM). In-memory buckets have a maximum capacity and when they reach their limit, they are committed to disk and replaced by a new bucket. Bucket storage size is another element of the bucketing policy and varies along with the size of the temporal extent. Finally, bucket policies typically enforce that buckets (a) do not overlap, and (b) cover all possible incoming time stamps.

Initially, the appropriate bucket for the event is identified 610 for event 605 based on the event's time stamp and the index's bucketing policy. Each incoming event 605 is assigned to the time bucket where the time stamp from the event corresponds, the bucket's temporal criteria. In one implementation, half-open intervals are used, defined by a start time and an end time where the start time is an inclusive boundary and the end time is an exclusive boundary. As a result, events occurring on bucket boundaries are uniquely assigned to a bucket. Following a database server event with the time stamp of 01-15-2005 12:00:00 might be assigned to the above-mentioned bucket.

At this point in the process, incoming events have time stamps, segments, and a time bucket associated with them. To create the persistent data structures that will be used later to perform lookups in the search process, the system stores the raw data of the event with its segmentation, create indices that map segments and time stamps to offsets in the event data store, and compute and store metadata related to the indices.

Index creation in one embodiment is divided into two separate phases: hot indexing and warm indexing. Hot indexes are managed entirely in RAM, are optimized for the smallest possible insert time, are not searchable, and do not persist. "Warm" indexes are searchable and persistent, but generally aren't modifiable. When hot indexes need to be made searchable or need to be persistent, they are converted into warm indexes.

A hot index contains a packed array of segments, a packed array of event addresses and their associated time stamps, and a postings list that associates segments with their time stamped event addresses. For performance reasons, the packed arrays can have hash tables associated with them to provide for quick removal of duplicates. When incoming events are being indexed 615, each segment of the event is tested for duplication using the segment array and its associated hash. The event address is also tested for duplication, against the event address array and its associated hash. If either of the attributes is a duplicate, then the instance of that duplicate that has already been inserted into the packed array is used. Otherwise, the new segment or event address is copied into the appropriate table and the associated hash table is updated. As events are inserted into the hot index, the space associated with each of the packed arrays gets used. A hot index is considered to be "at capacity" when one of its packed arrays fills up or when one of its hash tables exceeds a usage threshold (e.g., if more than half of the hash table is in use). Once a hot index reaches capacity, it typically may not accept more segments for indexing. Instead it is converted to a warm index, stored 620 to the database, and replaced with a new empty hot index.

During the course of the indexing process, it is possible that a single index will be filled and committed to disk 560 several times. This will result in multiple, independently searchable indices in database 135 for a single time span. In one embodiment, there is a merging process that takes as input two or more warm indices and merges them into a single warm index for that time bucket. In other embodiments, this performance optimization is not used.

Figure 7:
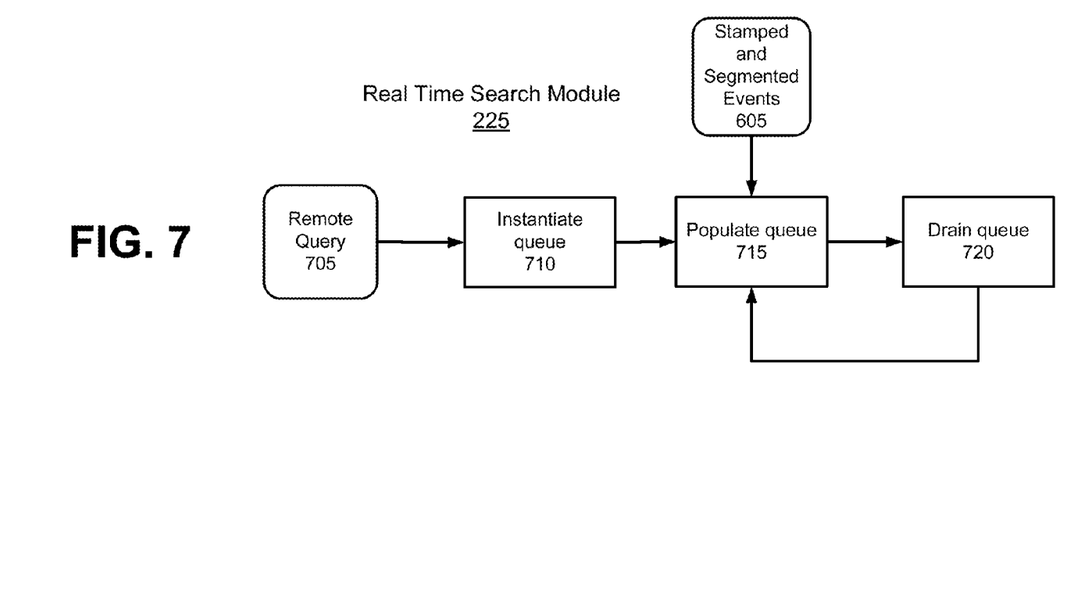
FIG. 7 shows one embodiment of the operation of a real time search module.

FIG. 7 illustrates at least one embodiment of the operation of real time search module 225. Real time search module 225 receives real-time search query 705, instantiates 710 a queue, populates 715 the queue with events 605 if they correspond to search query 705, and drains 720 the queue to return search results to search engine 130. The real time search module permits events to be searched in real-time as MD 405 is collected, thereby avoiding the inherent delay associated with storing events to a database. For example, referring to event storage module 220, a non-trivial amount of time may pass before a hot index fills up and is committed to database 135, where it can finally be searched. This delay may be less than a minute, but even a short delay can impact the effectiveness of time-sensitive applications such as security monitoring.

First, real-time search module 225 receives remote query 705 from search engine 210. Remote query 705 is discussed more below by reference to search engine 210. For example, remote query 705 may be a query for "all IP addresses that appear in server logs." In one embodiment, remote query 705 is in the form of a lispy query. A lispy query includes search tennis expressed as conjunctions (e.g., AND X Y), disjunctions (e.g., OR X Y), negation blocks (e.g., NOT X), or nested combinations (e.g., OR (AND X Y) Z) of search teens.

Real-time search module 225 then instantiates 710 a queue to capture events that correspond to remote query 705. The queue is instantiated 710 in the memory (e.g. RAM, flash, etc)

of server device 115 and associated with search query 705. In one embodiment, the queue is a circular queue. A circular queue is a data structure that has a single fixed size buffer. The size of the queue is determined when the queue is instantiated. The default size may be determined in a number of different ways, for example, from a configuration file received from client device 140 or from some other user input. The queue is empty when it is first instantiated, and as events are added to the buffer, the queue begins to fill up.

The queue is populated 715 by evaluating the real-time search query against events 605. The search query can be evaluated against the event data itself, the timestamp of the event, or individual segments of the event. If the event satisfies the search query, event 605 is stored into the queue. Event 605 can be stored either with or without its associated timestamp and segmentation data. In one embodiment, real-time search module 225 can stop processing events when the queue is full. Alternatively, the oldest events in the queue can simply be discarded when the queue is full. In a further embodiment, the size of the queue can be expanded when the queue reaches its maximum capacity.

As the queue is populated 715, the queue can be drained 720 by returning the contents of the queue to search engine 130 (not shown). The queue operates on a FIFO basis where the oldest events are the first to be emptied from the queue. The queue can be drained in any of a number of ways, such as in response to a request from search engine 130, on a periodic basis, or whenever the queue is full. The event data can also be returned to search engine 130 in any format, such as in comma-separated values (CSV) format.

Once the queue is established, the queue remains open and the system continuously evaluates all newly collected events 605 against remote query 705. The process of populating 715 and draining 720 the queue continues until a termination event occurs. Termination events include, for example, an indication from search engine 130 to end the search or the indexing engine 125 is shut down. In one embodiment, there may be multiple queues, each handling a different remote query 705 and running in parallel to evaluate new events 605.

Referring again to FIG. 2, note that real-time search module 225 can operate independently of or in conjunction with event storage module 220. For example, events 605 may be indexed by event storage module 220, while simultaneously being evaluated against a real-time search query by real-time search module 225. Alternatively, events 605 may be processed by real-time search module 225 and instead of event storage module 220.

Figure 3:
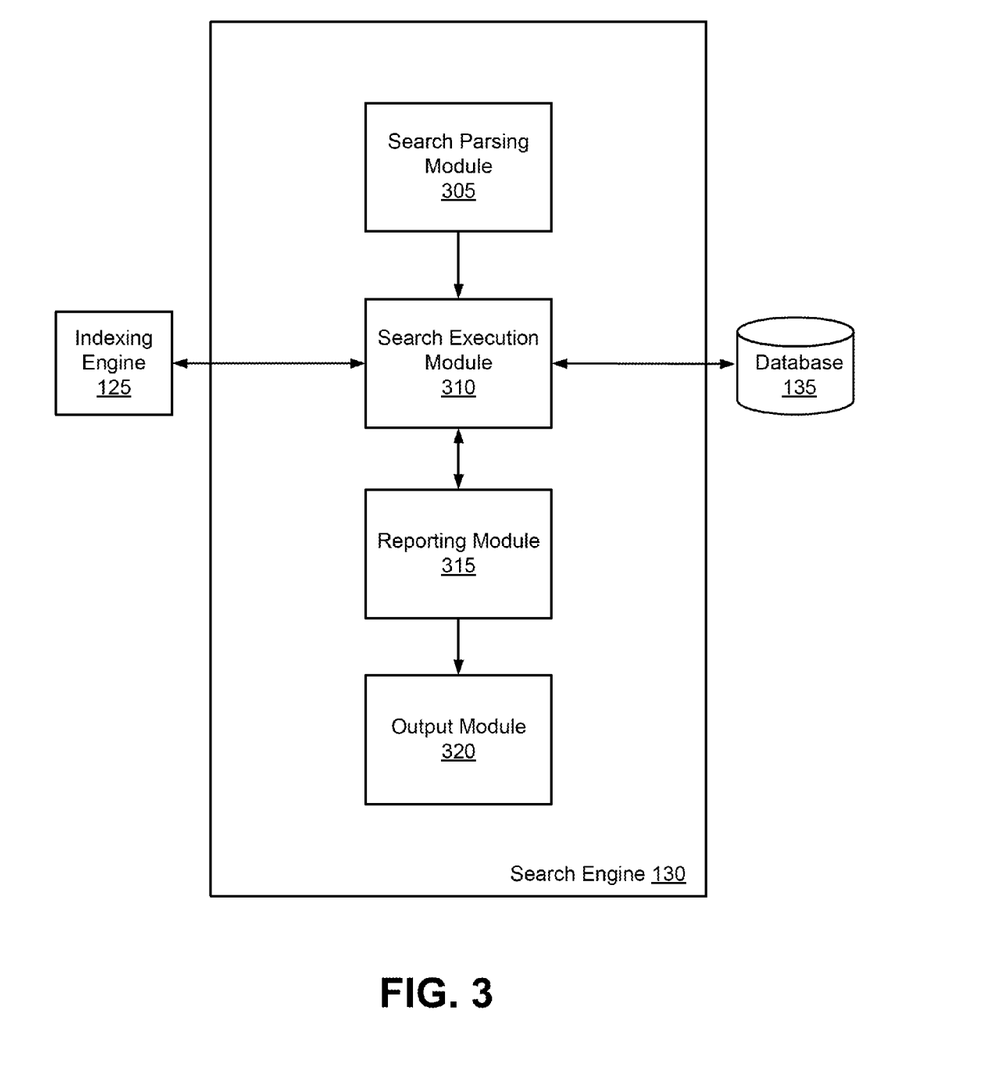
FIG. 3 shows one embodiment of a high level block diagram showing modules within a search engine.

FIG. 3 illustrates at least one embodiment of a high level block diagram of modules within search engine 130. Search engine 130 receives a search query from a client device 140, parses the query, performs either a real-time search or non-real time (historical) search, and generates a report of the results. As illustrated, search engine 130 includes a search parsing module 305, search execution module 310, reporting module 315, and output module 320. Search execution module 310 communicates with indexing engine 125 to perform real-time searches. Search execution module 310 also communicates with database 135 to perform historical searches. The operation of these modules is explained further below by reference to FIGS. 8-10.

Figure 8:
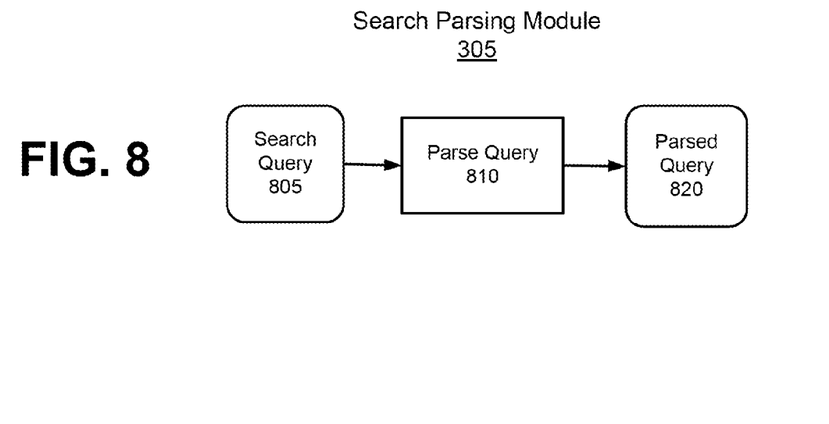
FIG. 8 illustrates one embodiment of the operation of a search parsing module.

FIG. 8 illustrates at least one embodiment of the operation of search parsing module 305. Search parsing module 305 receives search queries 805 and parses 810 them to determine where and how the search is to be run.

First, a search query 805 is received from client device 140. Search query 805 includes one or more data-generating commands and their arguments, which can include literal keywords, wildcards (*), Boolean expressions (AND, OR, NOT), and field name and value expressions (e.g. eventtype=webaccess error). In one embodiment, the search query is a pipelined search query. A pipelined search query includes an ordered sequence of commands, where the output of one command is used as the input to the next command. For example, the search query "Search1|Search2" is a pipeline of commands where the output of Search1 is used as the input to the Search2 command.

Next, search query 805 is parsed 810 by dividing the search query into two parts: a "remote query" and a "main query." When a search query is pipelined, the remote query and main query can be evaluated at separate times. In one embodiment, the remote query is evaluated on parts of the system that contain event data, such as indexing engine 125 or database 135, to collect search results. The main query is evaluated against the results collected by the remote query to generate a report that represents the final results of search query 805.

Parsing module 305 divides a pipelined search query into a remote query and a main query based on the properties of each command that make up the original search. In one embodiment, parsing module 305 locates the first command in the search query that may not be distributed. Whether a command can be distributed may depend on the arguments provided with the command. All the commands that come before that command are part of the remote query. All the commands that come after that command, including the command that may not be distributed, are part of the main query.

Generically speaking, an operation F can be distributed if $F(A+B)=F(A)+F(B)$, where A and B are two result sets and + represents the concatenation of result sets. More specifically, a command can be distributed if it operates on an event independently of all other events. For example, assume the search query contains the following four commands "message ERROR|eval user=id. name|stats count by user|where count>10." There are four commands in this search query. The message command searches for events that contain the keyword ERROR. This command is distributed because it is the first command. The user command identifies the user associated with the ERROR event. This command is also distributed because it operates on an event-by-event basis (i.e., on each ERROR event). The stats command counts the total number of times each user is associated with an ERROR message. This command may not be distributed because it may need all input events to be processed for ERRORs and users before emitting an output. The fourth command is not distributed because it follows a non-distributable command. Thus, the remote query comprises the first two commands, and the main query comprises the last two commands.

Figure 9:
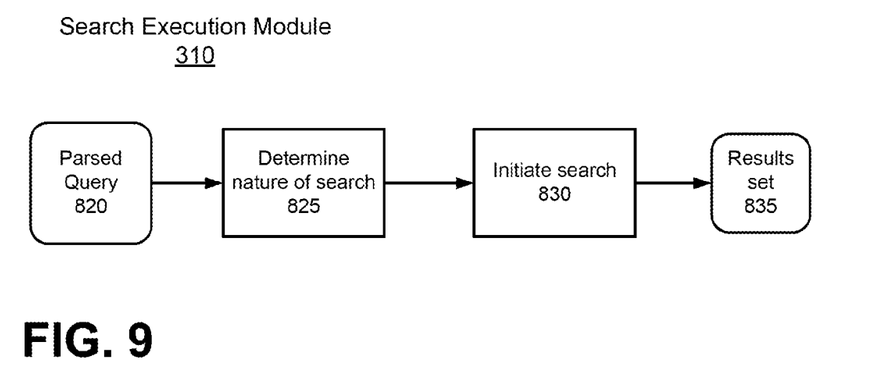
FIG. 9 shows one embodiment of the operation of the search execution module.

FIG. 9 illustrates at least one embodiment of the operation of search execution module 310. Search execution module 310 receives parsed query 820, determines the nature of the query (e.g., real-time, historical, or hybrid), and runs the appropriate search to generate a set 835 of results.

First, search execution module 310 determines 825 the nature of the search query, such as whether search query 820 is a real-time search query, historical search query, or hybrid search query. In one embodiment, the nature of a search query can be determined from an external attribute that is received along with the search query. For example, a user of client device 140 may be presented with a user interface that provides the option of selecting a real-time search, a historical search, or hybrid search by selecting an option from a drop down menu. The user selects an option when entering a search query, and this information is transmitted to search execution module 310 along with the search query. Upon receiving this information, search execution module 310 determines the nature of the search query from the user's selection.

In another embodiment, the nature of a search query can be determined from time range arguments in search query 820. For example, search query 820 may include the command "earliest=−5 h, latest=−20 h" which is a command to perform a non-real time search of events that occurred between 3 and 20 hours ago. As another example, query 820 may include the command "earliest=+0 h, latest=+365 d", which is a command to perform a real-time search of events for the next 365 days. Alternatively, query 820 may also include the command "earliest=−3 h, latest=+5 h", which is a command to perform a search of events that already occurred over the past 3 hours and events that will occur over the next 5 hours. This last search query is a hybrid search query.

Next, search execution module 830 initiates the search based on the nature of search query 820. If the query is a real-time search query, search execution module 310 evaluates query 820 against events as they are being collected by the system. Specifically, search execution module 310 delivers the remote query portion of search query 820 to real time search module 225 of indexing engine 125. In one embodiment, parsed query 820 is first converted to a lispy query before it is delivered to real time search module 225.

As previously described in conjunction with FIG. 7, real time search module 225 receives remote query 705, instantiates a queue 710, populates 715 the queue with events, and drains 720 the queue to return corresponding results to search execution module 310. The queue can be drained in any of a number of ways, such as in response to a request from search execution module 310, on a periodic basis, or whenever the queue is full. Search execution module 310 can also terminate the search for any of a number of reasons. In one embodiment, a real time search query is indefinite and continues to run until it is cancelled. Thus, search execution module 310 does not terminate the search until a user input is received that requests the search to be cancelled. In an alternate embodiment, a real time search query expires after a pre-defined amount of time, and search execution module 310 terminates the search once the time limit has been reached.

Referring back to FIG. 9, if query 820 is determined 825 to be a non-real time (i.e. historical) search query, the search is initiated 830 by evaluating query 820 against events that are stored in database 135. Events in database 135 are events that occurred in the past that have already been collected and indexed. Specifically, in at least one embodiment, only the remote query is evaluated against events in database 135 to identify corresponding events.

In another embodiment, if the search query is determined 825 to be a hybrid search query (i.e. both real-time and historical), the search is initiated 830 by evaluating search query 820 against both events stored in database 135 and events as they are being collected. Specifically, the remote query is evaluated against events in database 135 to identify corresponding events that occurred in the past. The remote query is also communicated to real time search module 225 of indexing engine 125 to identify corresponding events as they are being collected. The corresponding results of the search query, whether they be real-time, historical, or hybrid query, are collected to form set 835 of search results. Specifically, for events that correspond, the remote query evaluations are collected to form a set of search results. The system thus has the flexibility to handle searches for any type of data, whether collected in the past or in the future.

Figure 10:
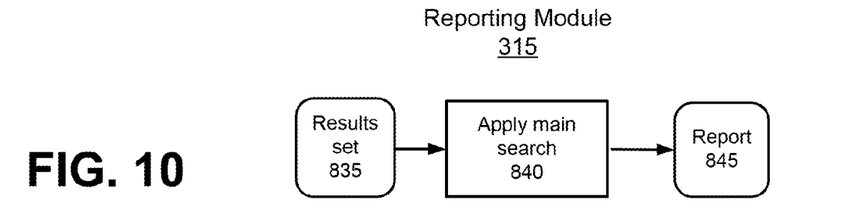
FIG. 10 illustrates one embodiment of the detailed operation of the reporting module.

FIG. 10 illustrates at least one embodiment of the operation of reporting module 315. Reporting module 315 receives a set 835 of results from search execution module 310. It then applies 840 the main query portion of the search query to results 835 and compiles the results into report 845. The report is akin to a summary of the collected machine data over some period of time and is based on the criteria (e.g., commands and parameters) defined in the received search query. For example, a user may enter a real-time search query for the ten IP addresses that appear with the highest frequency in future server logs. The remote portion of the search query is applied to incoming server logs to collect a list of events that have IP addresses on a continuous basis. At some point in time, the main portion of the search query is then applied to the list to generate a report that includes the top ten IP addresses from the list of collected IP addresses.

In one embodiment, the main query is applied 840 to entire set 835 of results at once. This creates a comprehensive report based on all results 835 collected by the search query so far. Alternatively, the set of results can be divided into individual sub-sets, and the main search can be separately applied 840 to each sub-set. For example, set 835 of results may be divided into sub-sets such that each sub-set corresponds to one minute of events. The main query is then separately applied to each sub-set of events.

Further, the main search can be applied at any time interval to generate or update the report. In one embodiment, the main search is applied on a periodic basis, such as every minute or every five minutes. When applied in the context of a historical search, this generates a preliminary report, or preview, of the search results when the remote search takes a long time to collect results 835 from database 135. When applied in the context of a real-time search, the report is also akin to a preview, although a real-time search can be unlimited in duration and generally may not finish. When used in the context of a real-time search and applied to results 835 that are divided into sub-sets, this creates a sliding window effect in which the report is constantly updated to reflect the most recently collected data. In another embodiment, the main search is applied in response to a user input requesting that a report be updated. In various embodiments, generating a report with the main query does not interrupt the ongoing collection of search results with the remote query.

Referring again to FIG. 3, output module 320 formats report 845 generated by reporting module 315 and outputs the report. Report 845 can be placed into a variety of formats suitable for transmission to client device 140, such as raw text, comma-separated-values (CSV), javascript object notation (JSON), extensible markup language (XML), portable document format (PDF), etc. In one embodiment, the report is presented in a graphical format, such as in a bar, pie, or line graph. The formatted results are then output to client devices 140 where they are displayed or stored to disk. Alternatively, the formatted results are output to storage within server device 115 or output to a display attached to server device 115.

Figure 11A:
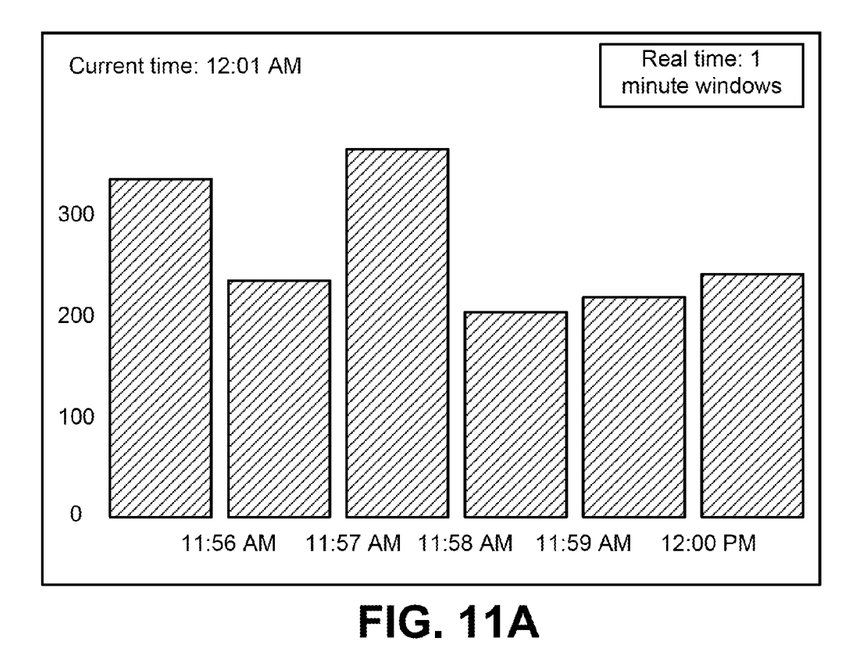
FIGS. 11A-11B show reports generated by a real-time search in accordance with at least one or more embodiments of the invention.
Figure 11B:
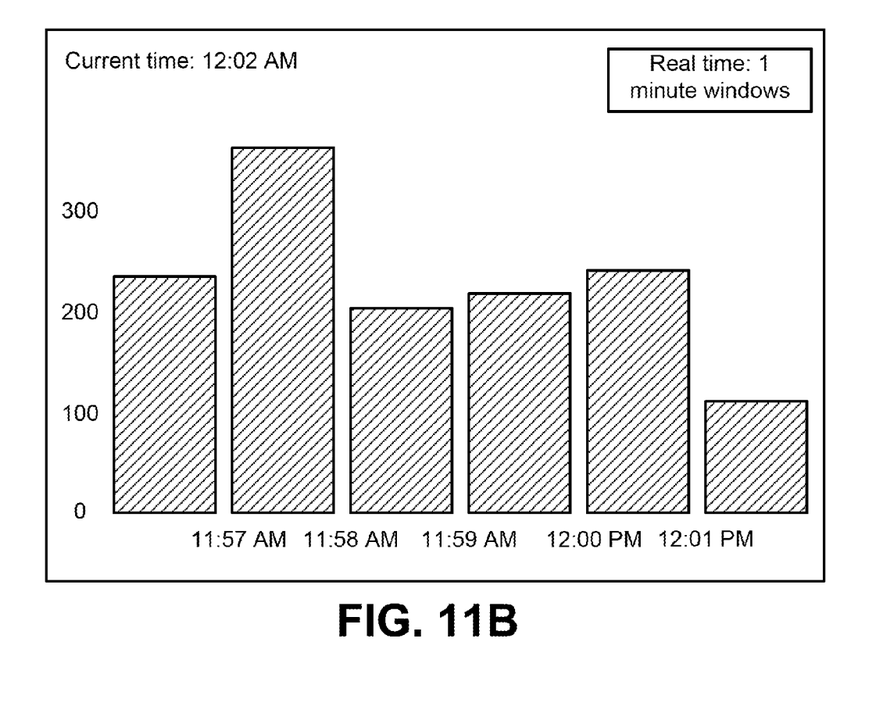

FIGS. 11A and 11B illustrate two exemplary reports generated by a real-time search, according to at least embodiment of the invention. Assume here that the user has entered a query for the number of ERROR messages in server logs of a company's IT infrastructure. The user has further selected that the search is a real time search and that the report should be divided into one minute time intervals. As shown in FIG. 11A, the report is generated as a bar graph. Each bar represents the number of ERROR messages identified from server logs within a one minute time window, which is determined through processes described herein. As shown in FIG. 11B, the report is updated when the time changes from 12:01 AM to 12:02 AM. The system continues to collect new machine data and collect search results with a remote query. The main query is then repeatedly applied to the search results at one minute intervals to update the report. This provides the user with a real-time report based on the entered search query, thereby facilitating the user's understanding of the current state of the company's IT systems.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect may not be mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as processing or computing or calculating or determining or displaying or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware, or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the invention is not described with reference to any particular programming language. It is appreciated that a variety of programming languages may be used to implement the teachings of the invention as described herein, and any references to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

What is claimed as new and desired to be protected by Letters Patent of the United States is:

1. A method for searching and reporting machine data with a computing device over a network, comprising:
   receiving a search query comprising a plurality of commands;
   employing a plurality of commands in the search query to generate a remote search query and a main search query;
   receiving machine data from at least one of a plurality of remote data sources that is then aggregated into a plurality of separate events, wherein each event includes at least one determined segment;
   performing the remote search query against the collected machine data to generate a search result associated with the remote search query; and
   performing the main search query against the search result to generate a report of the collected machine data.

2. The method of claim 1, wherein the plurality of commands includes a pipelined sequence of search commands.

3. The method of claim 1, wherein the search query is parsed to form the remote search query and the main search query based on whether commands in the plurality of commands are distributable.

4. The method of claim 1, wherein receiving machine data comprises collecting the machine data after receiving the search query.

5. The method of claim 1, wherein receiving the machine data comprises dividing the machine data into events, and performing the remote search query against the collected machine data comprises performing the remote search query against the events.

6. The method of claim 1, wherein the machine data includes at least one of a server log, an activity log and a database record.

7. The method of claim 1, wherein the remote search query is performed responsive to a determination that the search query is a real-time search query.

8. The method of claim 1, further comprising:
   receiving additional machine data;
   performing the remote search query against the additional machine data to generate an updated search result; and performing the main search query against the updated search result to generate an updated report.

9. The method of claim 1, further comprising outputting each report for display.

10. The method of claim 1, further comprising:
storing the collected machine data into a data store;
receiving another search query; and
if the other search query is determined to be non-real time, performing he other search query on the machine data stored in the data store.

11. A non-transitory computer-readable storage medium that comprises computer program code for searching and reporting machine data over a network, wherein execution of the computer program code by a processor enables actions, including:
receiving a search query comprising a plurality of commands;
employing a plurality of commands in the search query to generate a remote search query and a main search query;
receiving machine data from at least one of a plurality of remote data sources that is then aggregated into a plurality of separate events, wherein each event includes at least one determined segment;
performing the remote search query against the collected machine data to generate a search result associated with the remote search query; and
performing the main search query against the search result to generate a report of the collected machine data.

12. The medium of claim 11, wherein the plurality of commands includes a pipelined sequence of search commands.

13. The medium of claim 11, wherein the search query is parsed to form the remote search query and the main search query based on whether commands in the plurality of commands are distributable.

14. The medium of claim 11, wherein collecting machine data comprises collecting the machine data after receiving the search query.

15. The medium of claim 11, wherein the remote search query is performed responsive to a determination that the search query is real-time.

16. The medium of claim 11, wherein the actions further comprise:
receiving additional machine data;
performing the remote search query against the additional machine data to generate an updated search result; and
performing the main search query against the updated search result to generate an updated report.

17. A network device for searching and reporting machine data over a network, comprising: a transceiver for communicating over a network;
a memory for storing, a plurality of data; and
a processor for executing the data to perform actions, including;
receiving a search query comprising a plurality of commands;
employing a plurality of commands in the search query to generate a remote search query and a main search query;
receiving machine data from at least one of a plurality of remote data sources that is then aggregated into a plurality of separate events, wherein each event includes at least one determined segment;
performing the remote search query against the collected machine data to generate a search result associated with the remote search query; and
performing the main search query against the search result to generate a report of the collected machine data, 18. The network device of claim 17, wherein the plurality of commands includes a pipelined sequence of search commands.

19. The network device of claim 17, wherein the search query is parsed to form the remote search query and the main search query based on whether commands in the plurality of commands are distributable.

20. The network device of claim 17, wherein receiving machine data comprises collecting the machine data after receiving the search query.

21. The network device of claim 17, wherein receiving the machine data comprises dividing the machine data into events, and performing the remote search query against the collected machine data comprises performing the remote search query against the events.

22. The network device of claim 17, wherein the machine data includes at least one of a server log, an activity log and a database record.

23. The network device of claim 17, wherein the remote search query is performed responsive to a determination that the search query is a. real-time search query.

24. The network device of claim 17, further comprising:
receiving additional machine data;
performing the remote search query against the additional machine data to generate an updated search result; and
performing the main search. query against the updated search result to generate an updated report.

25. The network device of claim 17, further comprising outputting each report for display.

26. The network device of claim 17, further comprising:
storing the collected machine data into a data store;
receiving another search query; and
if the other search query is determined to be non-real time, performing the other search query on the machine data stored in the data store.

27. A system for searching and reporting machine data over a network, comprising:
a server device that performs actions; including:
receiving a search query comprising a plurality of commands;
employing a plurality of commands in the search query to generate a remote search query and a main search query;
receiving machine data from at least one of a plurality of remote data sources that is then aggregated into a plurality of separate events, wherein each event includes at least one determined segment:
performing the remote search query against the collected machine data to generate a search result associated with the remote search query; and
performing the main search query against the search result to generate a report of the collected machine data; and
a client device that performs actions including:
providing the search query to the server device; and
displaying the report to a user.

28. The network device of claim 27, wherein the search query is parsed to form the remote search query and the main search query based on whether commands in the plurality of commands are distributable.

29. The network device of claim 27, wherein receiving the machine data comprises dividing the machine data into events, and performing the remote search query against the collected machine data comprises performing the remote search query against the events.

30. The network device of claim 27, further comprising:
receiving additional machine data;
performing the remote search query against the additional machine data to generate an updated search result; and
performing the main search query against the updated search result to generate an updated report for display by the client device.

31. The network device of claim 27, farther comprising:
storing the collected machine data into a data store;
receiving another search query; and
if the other search query is determined to be non-real time, performing the other search query on the machine data stored in the data store.

* * * * *